United States Patent
Bower, III

(10) Patent No.: US 8,245,231 B2
(45) Date of Patent: *Aug. 14, 2012

(54) METHOD OF LAUNCHING LOW-PRIORITY TASKS

(75) Inventor: Fred A. Bower, III, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 1357 days.

This patent is subject to a terminal disclaimer.

(21) Appl. No.: 11/861,957

(22) Filed: Sep. 26, 2007

(65) Prior Publication Data

US 2008/0235694 A1    Sep. 25, 2008

Related U.S. Application Data

(63) Continuation of application No. 09/898,978, filed on Jul. 2, 2001, now Pat. No. 7,356,820.

(51) Int. Cl.
*G06F 9/46* (2006.01)

(52) U.S. Cl. ........................ 718/103; 718/102

(58) Field of Classification Search .................. 718/102, 718/103
See application file for complete search history.

(56) References Cited

U.S. PATENT DOCUMENTS

| | | | |
|---|---|---|---|
| 4,123,795 A * | 10/1978 | Dean et al. | 718/103 |
| 4,475,156 A * | 10/1984 | Federico et al. | 718/102 |
| 5,379,428 A * | 1/1995 | Belo | 718/103 |
| 6,021,438 A | 2/2000 | Duvoori et al. | |
| 6,088,796 A | 7/2000 | Cianfrocca et al. | |
| 6,119,118 A | 9/2000 | Kain, III et al. | |
| 6,349,336 B1 | 2/2002 | Sit et al. | |
| 6,393,481 B1 | 5/2002 | Deo et al. | |
| 6,442,550 B1 | 8/2002 | Rajamony | |
| 6,460,037 B1 | 10/2002 | Weiss et al. | |
| 6,460,070 B1 | 10/2002 | Turek et al. | |
| 6,529,932 B1 | 3/2003 | Dadiomov et al. | |
| 6,621,851 B1 | 9/2003 | Agee et al. | |
| 6,647,421 B1 | 11/2003 | Logue et al. | |
| 6,697,962 B1 | 2/2004 | McCrory et al. | |
| 6,704,819 B1 | 3/2004 | Chrysanthakopoulos | |
| 6,782,495 B2 | 8/2004 | Bernklau-Halvor | |
| 7,356,820 B2 * | 4/2008 | Bower, III | 718/103 |
| 7,757,238 B2 * | 7/2010 | Cavallo | 718/108 |
| 2001/0034558 A1 * | 10/2001 | Hoskins | 700/13 |
| 2002/0055846 A1 * | 5/2002 | Tsuchitani et al. | 704/275 |
| 2002/0055980 A1 | 5/2002 | Goddard | |
| 2002/0107905 A1 | 8/2002 | Roe et al. | |

(Continued)

*Primary Examiner* — Jennifer To
*Assistant Examiner* — Abu Z Ghaffari
(74) *Attorney, Agent, or Firm* — Lieberman & Brandsdorfer, LLC

(57) ABSTRACT

A driver is provided to manage launching of tasks at different levels of priority and within the parameters of the firmware interface. The driver includes two anchors for managing the tasks, a dispatcher and an agent. The dispatcher operates at a medium priority level and manages communication from a remote administrator. The agent functions to receive communications from the dispatcher by way of a shared data structure and to launch lower priority level tasks in respond to the communication. The shared data structure stores communications received from the dispatcher. Upon placing the communication in the shared data structure, the dispatcher sends a signal to the agent indicating that a communication is in the data structure for reading by the agent. Following reading of the communication in the data structure, the agent launches the lower priority level task and sends a signal to the data structure indicating the status of the task. Accordingly, a higher level task maintains its level of operation and spawns lower level tasks through the dispatcher in conjunction with the agent.

11 Claims, 3 Drawing Sheets

U.S. PATENT DOCUMENTS

| | | |
|---|---|---|
| 2002/0112089 A1 | 8/2002 | Zargham et al. |
| 2002/0133805 A1 | 9/2002 | Pugh et al. |
| 2002/0138670 A1 | 9/2002 | Johnson |
| 2002/0147389 A1 | 10/2002 | Cavallaro et al. |
| 2002/0156932 A1 | 10/2002 | Schneiderman |
| 2003/0214943 A1 | 11/2003 | Engstrom et al. |
| 2004/0133609 A1* | 7/2004 | Moore et al. .................. 707/200 |

* cited by examiner

METHOD OF LAUNCHING LOW-PRIORITY TASKS

CROSS REFERENCE TO RELATED APPLICATION(S)

This application is a continuation of application Ser. No. 09/898,978, filed on Jul. 2, 2001, now pending, which is hereby incorporated herein by reference.

BACKGROUND OF THE INVENTION

1. Technical Field

This invention relates to a driver operating in a firmware environment. More specifically, the driver manages launching of tasks at different priority levels while maintaining a predetermined level of operation.

2. Description of the Prior Art

Firmware is software that is stored in hardware, such that the software is retained even after power to the hardware ceases. At boot time, the firmware of a computer or computer system stores and uses information describing a computer's processors, nodes, memory and other devices. The firmware operates on a parallel platform to the operating system.

In prior art computers, the firmware enabled system interrupts to occur in order to launch different applications at different priority levels. The prior art systems require a greater amount of functionality to accommodate system interrupts. Some firmware interface environments disable system interrupts to reduce the amount of functionality required to operate the machines in the system. The Intel Extensible Firmware Interface (EFI) is one firmware environment which reduces functionality required to operate the machine by disabling interrupts. In addition to disabling system interrupts, tasks within the EFI may temporarily increase their priority level of operation, but they are not allowed to decrease the priority level. Accordingly, tasks operating within the EFI environment, or similar platforms, are not permitted to execute system interrupts to execute tasks that may be operating at different levels of priority and may increase priority levels.

There are two types of operating programs within the EFI: a driver and an application. The driver provides a set of resources, i.e. programming interfaces. Once a driver is loaded within the firmware environment, it remains in the system for future application. The driver is not permitted to load other drivers after its initialization has completed. In addition, the EFI also prohibits the ability to load applications from a resident driver. An application is an executable program that is loaded, executed and expires. During run time, the application can load other drivers and applications. Accordingly, the application is executed for loading a driver to operate within the firmware environment and within the protocols of the system.

There is therefore a need to launch a driver that will prioritize execution of different priority levels of tasks within the confines of the EFI firmware environment. The driver must be launched by an application that will allow it to remain resident within the firmware and will provide all the required protocols for operating independently and without the need to launch secondary drivers. Accordingly, it is desirable to design a driver that will allow lower priority level applications to be launched without executing a system interrupt and without changing the priority level of a higher level application already in use.

SUMMARY OF THE INVENTION

This invention comprises a driver for operating in a firmware environment. The driver manages launching of tasks at different priority levels while maintaining a predetermined level of operation.

In one aspect of this invention, a computer implemented method is provided for managing tasks. A message manager operating at a high priority level is provided to receive a message from a remote administrator within system firmware to launch a low priority task. The message manager communicates the low priority task to the task manager by placing a message in a shared location accessible by both the message manager operating at the high priority level and a task manager operating at a low priority level. The task manager launches the low priority task received from the message manager in response to receipt of a communication from the message manager in the shared location. At all times, the message manager maintains operation at the high priority level and the task manager maintains operation at the low priority level.

In another aspect of the invention, a computer system is provided with a remote administrator located in firmware, and a set of resources loaded in the firmware and in communication with the remote administrator. The resources include a message manager, a task manager and a shared location. The message manager operates at a high priority level to receive a message from the administrator to launch a low priority level task; the task manager operates at a low priority level to launch the low priority level task; and the shared location, which is accessible by both the message manager operating at the high priority level and the task manager operating at the low priority level, facilitates communication between the message manager and the task manager. The message manager communicates the low priority level task received from the message manager to the task manager through the shared location. The task manager launches the low priority level task received from the message manager in response to receipt of the message in the shared location. At all times, the task manager maintains the low priority level of operation and the message manager maintains the high priority level of operation.

In yet another aspect of the invention, an article is provided with a computer-readable carrier including a remote administrator located in firmware and a set of resources in the firmware in communication with the remote administrator. Computer program instructions configured to manage tasks in the firmware are provided to facilitate communication and execution of tasks within the firmware. Instructions are provided to maintain a message manager at a high priority level to receive a message from the remote administrator within system firmware to launch a low priority task. In response to the instructions pertaining to receipt of the message by the message manager, instructions are provided for the message manager to place the message in a shared location accessible by both the message manager and a task manager operating at a low priority level. Furthermore, instructions are provided to communicate the low priority level task to the task manager in response to placement of the message in the shared location, and instructions are provided for the task manager to launch the low priority task received from the message manager in response to receipt of a communication from the message manager in the shared location. At all times, the message manager maintains operation at the high priority level and the task manager maintains operation at the low priority level.

Other features and advantages of this invention will become apparent from the following detailed description of

DESCRIPTION OF THE PREFERRED EMBODIMENT

Overview

In a low-level operating environment, system interrupts may be disabled to reduce the amount of functionality required to operate the machine. This environment allows operating functions to increase their specific level of operation, but does not allow them to decrease their level of operation. The method and system of the preferred embodiment employ a shared data structure in conjunction with a communication tool to allow a higher priority task to launch lower priority tasks. Accordingly, this allows for a higher priority task to maintain a specific level of operation.

Technical Details

Specific extensible firmware environments are known to operate at a low level without the use of system interrupts. The Intel EFI is one such firmware environment. In addition to disabling interrupts, the firmware places additional limitations in its functionality. For example, the firmware limits a task to one of three priority levels, low, medium and high. A given task may temporarily increase its priority level of operation if it is operating at a low or medium priority level, but it is not allowed to decrease its level of operation. In addition, the only place the firmware enables a driver to load other firmware modules is in its initialization code. Accordingly, a driver to enable launching of lower priority tasks must work within the confines of the firmware protocols.

Figure 1:
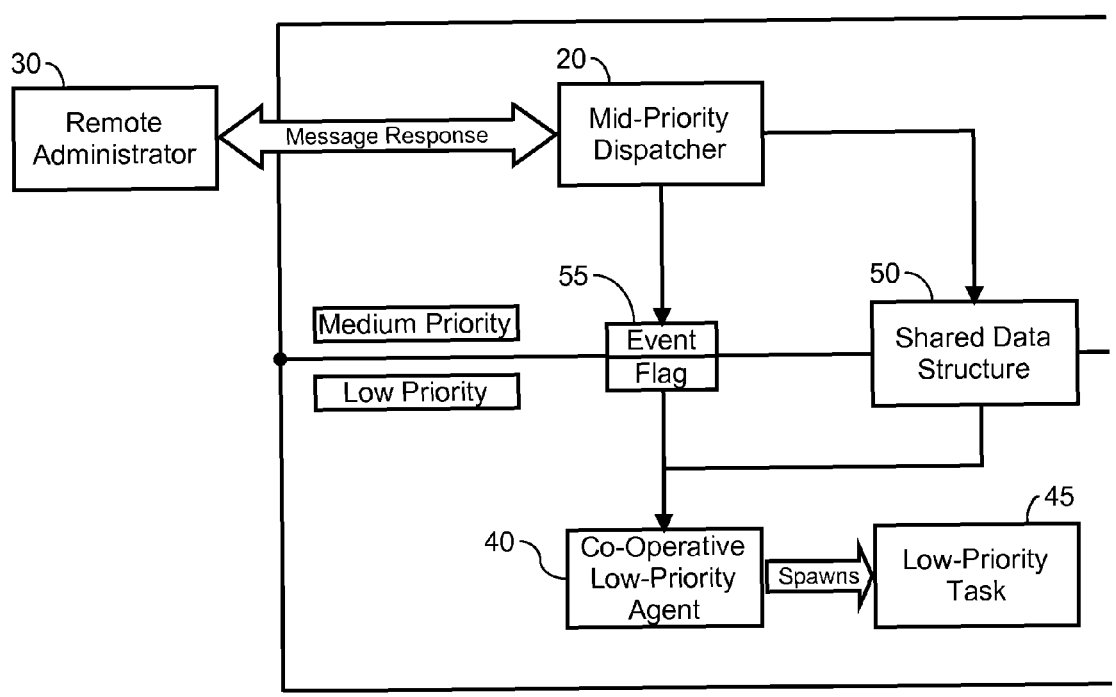
FIG. 1 is a block diagram of the driver according to the preferred embodiment of this invention, and is suggested for printing on the first page of the issued patent.

The driver must provide for a higher priority task to maintain operation at a higher level of operation, i.e. high or medium level in a three tier environment. FIG. 1 is a block diagram (10) illustrating the flow of communication in the diagnostic device driver of the preferred embodiment. The two primary components of the driver are a dispatcher (20) for receiving messages from a remote administrator (30), and an agent (40) for launching lower level tasks. The remote administrator (30) exists within the firmware and is responsible for running diagnostics. The dispatcher (20) receives messages from the remote administrator (30) and responds to receipt of the messages. Upon receiving a communication from the remote administrator (30), the dispatcher (20) communicates receipt to a data structure (50). Accordingly, the dispatcher (20) functions as a communication tool from the remote administrator (30) to the data structure (50).

The dispatcher (20) operates at a medium priority level and functions to receive and respond to messages from a remote administrator (30), and to place the messages in the shared data structure (50). Within the restrictions of the firmware environment, the dispatcher is unable to load tests. The dispatcher (20) does not execute operations, rather it functions as a communication tool for a higher level task desiring to launch a lower level task. In the confines of the system design, the higher level task cannot lower its priority level. Therefore, the higher level task must communicate the desire to spawn a lower priority level task. The agent (40) is resident at a lower priority level to act as a command dispatcher and to launch applications and load drivers (45) at lower priority levels. Accordingly, the dispatcher (20) is employed to assist in the spawning of tasks at a lower priority level of operation than the higher level task.

The data structure (50) is shared between the dispatcher (20) and the agent (40). The shared memory provides a basis for communication between the higher level task and the agent (40). The shared data structure (50) is a communication base shared by the two components. The agent (40) operates at a lower priority level than the dispatcher (20). Upon receiving messages from the remote administrator (30), the dispatcher (20) communicates receipt with the shared data structure (50). The shared data structure (50) communicates receipt of a communication from the dispatcher to the agent (40). A flag (55) is utilized as a communication tool from the shared data structure (50) to the agent (40). Accordingly, the dispatcher (20) and the agent (40) are the two major components of the diagnostic driver utilizing the flag (55) as the communication tool therebetween.

The agent (40) functions to launch lower level tasks in a loop. The agent (40) launches a lower level task only when prompted to do so by an event triggered by a higher level task. The agent (40) functions to perform a desired activity on behalf of the higher level task, while allowing the higher level task to maintain operation at its specified level. The flag (55) is instituted to awaken the agent (40) when a spawning of a lower level task is desired. Upon receiving the flag (55), the agent (40) reads the message placed in the shared data structure by the dispatcher (20). The flag (55) is a signal for the agent (40) to read the shared data structure (50) at a particular position. The agent (40) then launches the requested task at the lower priority level. Once the lower level task (60) has been launched, the agent (40) resets the flag (55). Accordingly, the agent (40) remains in an inactive state until such time as a flag (55) is set by the placement of a command message in the shared data structure (50).

Figure 2:
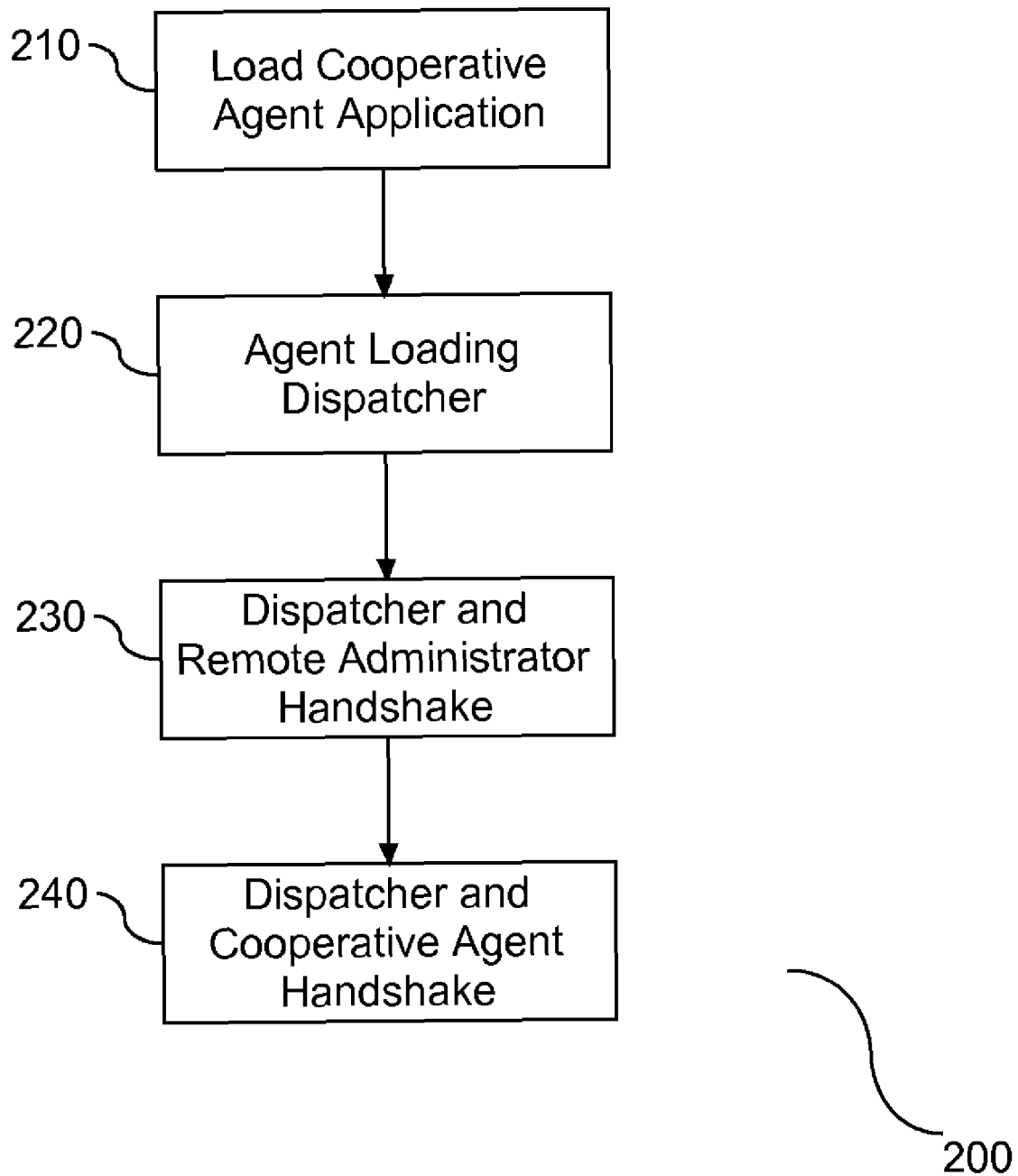
FIG. 2 is a flow chart illustrating the process of initializing the driver.

FIG. 2 is a flow chart (200) illustrating implementation of the structure of the preferred embodiment. The firmware only permits drivers to load other firmware modules in its initialization code, it does not permit a driver to load other drivers after the driver's initialization has completed. Within these confines, the agent in the form of an application is the first module to be loaded (210). An application can load other applications and drivers during run time. The agent application is responsible for loading the remaining components of the structure, including the dispatcher (220). The remote administrator is existent within the firmware, and does not require any loading by the agent application. The remote administrator represents a control entity within the firmware and is responsible for running diagnostics and a path to the user interface. During loading of the dispatcher driver (220), the dispatcher and the remote administrator handshake (230), thereby making both the dispatcher and the remote administrator aware of their functions. Additionally, the dispatcher and the agent handshake (240) making both anchors aware of their related functions. In a preferred embodiment, the order of the handshaking steps (230) and (240) is interchangeable and is not critical to the function of the driver. The agent application acts as a command dispatcher for the diagnostic test following installation as a driver. This allows the dispatcher to spawn sub-tests at a lower priority. Accordingly, loading the structure in the form of drivers and adhering to the firmware guidelines allows the drivers within the structure to operate in stages.

Figure 3:
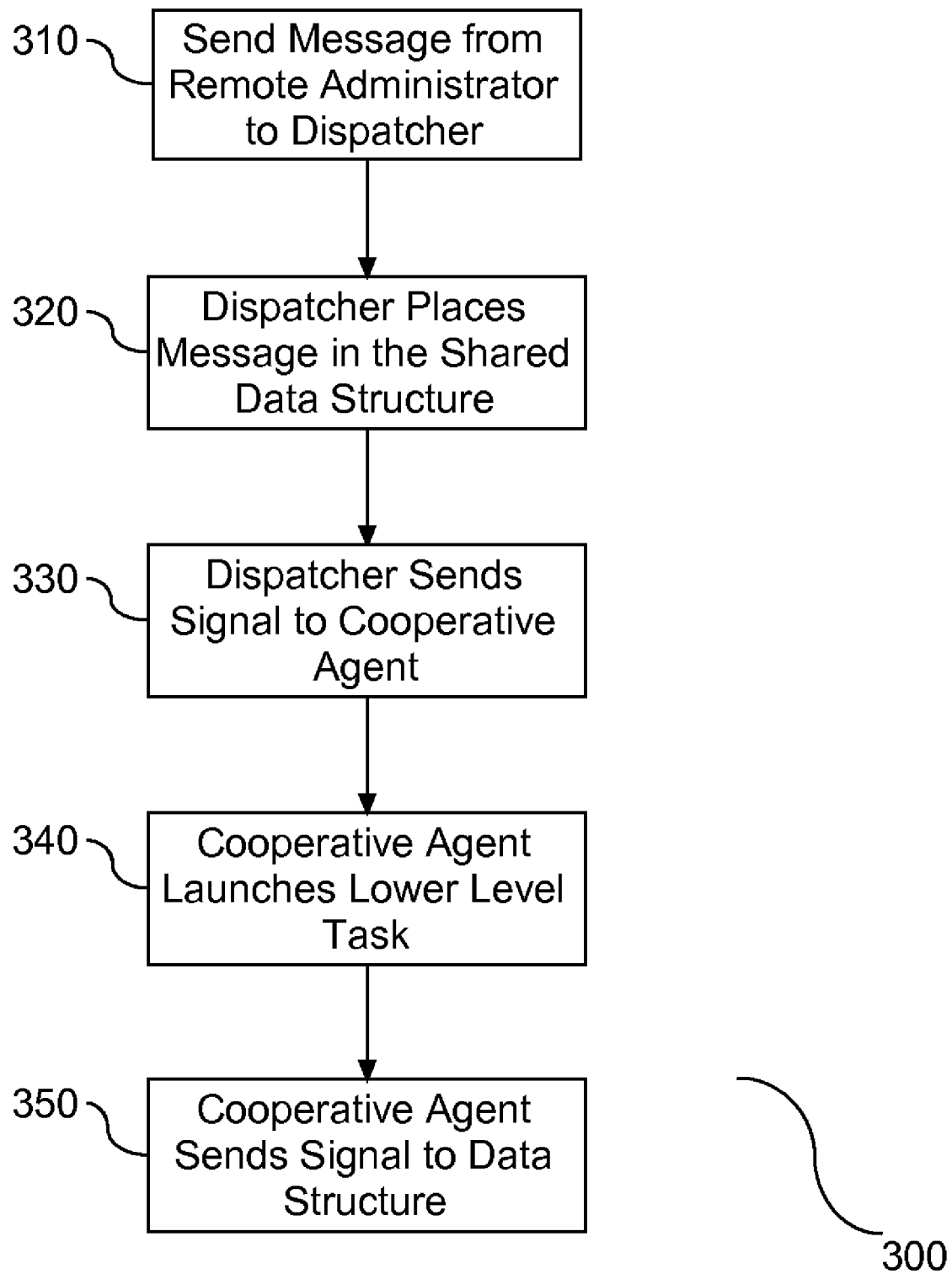
FIG. 3 is a flow chart illustrating the process of launching a lower priority task.

FIG. 3 is a flow chart (300) illustrating the process of launching a lower priority level task from a higher level priority task. The remote administrator sends a message to the dispatcher (310) indicating the need to launch a lower priority level task. The dispatcher communicates receipt of the message from the remote administrator by placing a message in the shared data structure (320). Upon receiving a message from the shared dispatcher, the shared data structure sends a signal to the agent (330) indicating the need to launch a lower priority level task. The agent receives the signal and reads the instructions placed in the shared data structure. Following receipt of the instructions, the agent spawns the requested lower priority level task (340). Once the lower priority level task has been launched, the agent sends a signal to the data structure (350) indicating launching of the lower priority level task. The agent remains idle until the next time it receives a signal (330) from the shared data structure to launch a lower priority level task. Accordingly, the process employed for launching lower priority level tasks from a higher priority level tasks allows the agent to remain in memory in an inactive state until events cause the agent to become active.

Advantages Over the Prior Art

Prior art systems are designed to accommodate system interrupts to permit spawning of different tasks at different levels of operation. To either avoid the use of system interrupts, or in an environment where system interrupts are disabled, the invention permits the launching of lower priority level tasks without requiring the need to invoke a system interrupt or await a pause in the higher level task's operations.

Alternative Embodiments

It will be appreciated that, although specific embodiments of the invention have been described herein for purposes of illustration, various modifications may be made without departing from the spirit and scope of the invention. In particular, the scope of the invention is not limited to a three level system. The invention may be incorporated into a system with fewer or greater priority levels of operations. In addition, the invention may be incorporated into a system designed to accommodate system interrupts. Accordingly, this would allow the system to continue operation by disabling interrupts and incorporating the driver herein to enable launching of lower priority level tasks during operation of a higher priority level task.

In addition to operation of the system, the method of installing the driver is merely a preferred method of installing the components of the driver. However, there may be alternative methods of installation which would allow the components of the driver to function within the design parameters of the system firmware. Additionally, the agent does not necessarily have to be a cooperative agent application. Accordingly, the scope of protection of this invention is limited only by the following claims and their equivalents.

I claim:

1. A computer implemented method for managing tasks comprising:
  a driver including a message manager and a task manager loaded in firmware, the message manager operating at a high priority level receiving a message from a remote administrator within the system firmware to launch a low priority task;
  said message manager communicating said low priority task to said task manager by placing the message in a shared location and setting a flag signaling placement of said message, wherein said shared location is accessible by said message manager operating at said high priority level and the task manager operating at a low priority level; and
  said task manager reading the message from the shared location in response to said flag, and launching said low priority task received from said message manager in response to the message from said message manager in said shared location, wherein launching said low priority task further performed without a suspension selected from the group consisting of: a system interrupt, and a pause in a higher level task operation, wherein said message manager maintaining operation at said high priority level and said task manager maintaining operation at said low priority level.

2. The method of claim 1, wherein the step of communicating said low priority task to said task manager include communicating the flag for signaling placement of said message to said task manager.

3. The method of claim 2, further comprising said task manager reading said message in said shared location in response to receiving said flag and subsequently launching said low priority task.

4. The method of claim 3, further comprising said task manager resetting said flag following launch of said low priority task.

5. A computer system comprising:
  a remote administrator located in firmware;
  a set of resources within a driver loaded in said firmware and in communication with said remote administrator, said resources comprising:
  a message manager operating at a high priority level to receive a message from said administrator to launch a low priority level task;
  a task manager operating at a low priority level to launch said low priority level task;
  a shared location accessible by said message manager operating at said high priority level and said task manager operating at said low priority level, said shared location to facilitate communication between said message manager and said task manager;
  said message manager to communicate said low priority level task received from said message manager to said task manager through said shared location and to set a flag signaling placement of said message in the said location shared by the task manager and the message manager; and
  said task manager to read the message from the shared location in response to said flag and launch said low priority level task received from said message manager in response to receipt of said message in said shared location, wherein launch of said low priority task is further performed without a suspension selected from the group consisting of: a system interrupt, and a pause in a higher level task operation, wherein said task manager maintains said low priority level of operation and said message manager maintains said high priority level of operation.

6. The system of claim 5, further comprising the flag communicated to said task manager from said message manager to signal receipt of said communication in said shared location.

7. The system of claim 6, wherein said task manager reads said message in said shared location and launches said low priority task in response to receipt of said communication.

8. The system of claim 6, further comprising said task manager to reset said flag in said shared location in response to launch of said low priority task.

9. An article comprising:
  computer storage including a remote administrator located in firmware and a set of resources in said firmware in communication with said remote administrator, and computer program instructions configured to manage tasks in said firmware, said instructions comprising:
  instructions to maintain a driver including a message manager and a task manager loaded in firmware;
  instructions to maintain the message manager at a high priority level to receive a message from said remote administrator within system firmware to launch a low priority task;
  instructions for said message manager to place said message in a shared location and to set a flag signaling placement of said message, wherein said shared location is accessible by said message manager and the task manager operating at a low priority level;
  instructions to communicate said low priority level task to said task manager in response to placement of said message in said shared location; and
  instructions for said task manager to read the message from the shared location in response to said flag and to launch said low priority task received from said message manager in response to the message from said message manager in said shared location, wherein launching said low priority task is further performed without a suspension selected from the group consisting of: a system interrupt, and a pause in a higher level task operation, wherein said message manager maintaining operation at said high priority level and said task manager maintaining operation at said low priority level.

10. The article of claim 9, wherein the instructions to communicate said low priority task to said task manager includes instructions to communicate the flag to signal presence of said message and said task manager to read said message in said shared location and to launch said low priority task in response to said flag.

11. The article of claim 10, further comprising instructions to reset said flag following launch of said low priority task.

* * * * *